United States Patent
Gorgi et al.

(10) Patent No.: US 10,155,346 B1
(45) Date of Patent: Dec. 18, 2018

(54) CALIBRATION SYSTEM AND METHOD FOR DETERMINATION OF RELATIVE POSITION OF TWO COMPONENTS IN MULTI-AXIS MOTION SYSTEM

(71) Applicants: Norvan Gorgi, Glendale, CA (US);
Steven Schell, Arcadia, CA (US);
Derek Schulte, Los Angeles, CA (US)

(72) Inventors: Norvan Gorgi, Glendale, CA (US);
Steven Schell, Arcadia, CA (US);
Derek Schulte, Los Angeles, CA (US)

(73) Assignee: NEW MATTER, INC., Pasadena, CA (US)

( * ) Notice: Subject to any disclaimer, the term of this patent is extended or adjusted under 35 U.S.C. 154(b) by 381 days.

(21) Appl. No.: 15/187,705

(22) Filed: Jun. 20, 2016

Related U.S. Application Data

(60) Provisional application No. 62/183,643, filed on Jun. 23, 2015.

(51) Int. Cl.
| | | |
|---|---|---|
| *B29C 67/00* | (2017.01) | |
| *B33Y 30/00* | (2015.01) | |
| *B33Y 50/00* | (2015.01) | |
| *G05B 19/042* | (2006.01) | |
| *B29K 101/12* | (2006.01) | |
| *B29K 105/00* | (2006.01) | |

(52) U.S. Cl.
CPC ...... *B29C 67/0088* (2013.01); *B29C 67/0055* (2013.01); *B29C 67/0092* (2013.01); *B33Y 30/00* (2014.12); *B33Y 50/00* (2014.12); *G05B 19/042* (2013.01); *B29K 2101/12* (2013.01); *B29K 2105/0067* (2013.01); *G05B 2219/49023* (2013.01)

(58) Field of Classification Search
None
See application file for complete search history.

(56) References Cited

U.S. PATENT DOCUMENTS

2014/0117575 A1* 5/2014 Kemperle ............... B29C 47/92
264/40.7

\* cited by examiner

*Primary Examiner* — Cory W Eskridge
(74) *Attorney, Agent, or Firm* — Andrew S. Naglestad

(57) ABSTRACT

A system and method for calibrating the gap between a 3D printer extruder nozzle and build platform are disclosed. To calibrate, the build platform is moved laterally in the horizontal plane and the extruder nozzle is moved downward toward the build platform. While moving the nozzle downward, the velocity of the build platform or the power required to move the build platform in the horizontal plane is monitored. A drop in velocity or an increase is power required to move the build platform is detected when the extruder nozzle contacts the build platform due to kinetic friction. The vertical height of the extruder nozzle is then set or calibrated relative to the build platform based on the position of the extruder nozzle when the contact was detected.

15 Claims, 8 Drawing Sheets

CALIBRATION SYSTEM AND METHOD FOR DETERMINATION OF RELATIVE POSITION OF TWO COMPONENTS IN MULTI-AXIS MOTION SYSTEM

CROSS-REFERENCE TO RELATED APPLICATION(S)

This application claims the benefit of U.S. Provisional Patent Application Ser. No. 62/183,643 filed Jun. 23, 2015, titled "Calibration system and method for determination of relative position of two components in multi-axis motion system," which is hereby incorporated by reference herein for all purposes.

TECHNICAL FIELD

The invention generally relates to a mechanical system for precisely measuring the distance between two components. In particular, the invention relates to a system and technique for calibrating the distance between moving components in a 3D printer.

BACKGROUND

Some three dimensional (3D) printers create objects layer by layer. These printers use additive manufacturing processes to build stacks of 2D slices into a 3D object from the based up. The dimensions and thickness of the 2D slices are precisely controlled through the movement of the printer head, i.e., extruder nozzle, and the build platform. This enables the printer to accurately control the shape and thickness of each layer printed. The thickness of the first layer applied to the build platform, however, is especially important because it affects the layer thickness as well as the adhesion of the object to the build platform. There is therefore a need for a system for precisely calibrating the distance between the extruder nozzle and build platform.

SUMMARY

The invention in the preferred embodiment features a method and a system for calibrating the gap between two components, for example, an extruder nozzle and a build platform in a 3D printer. The method comprises the steps of: moving the build platform in the horizontal plane; moving the extruder nozzle downward toward the build platform or vis versa; monitoring power required to move the build platform in the horizontal plane; detecting an increase in power required to move the build platform in the horizontal plane, which indicates contact between the build platform and the extruder nozzle; calibrating the vertical height of the extruder nozzle relative to the build platform based on the position of the extruder nozzle when the increase in power was detected. In the preferred embodiment, the power supplied to the actuator(s) moving the build platform increases when the build platform and extruder nozzle touch do to kinetic friction. In other embodiments, kinetic friction is detected based on a change in the speed of the platform.

In the preferred embodiment, the extruder nozzle moves down and the build platform moves laterally at the same time. The extruder nozzle may move in a continuous motion or discrete steps of about 35 microns or lower. In other embodiments, both the extruder nozzle and build platform move in discrete steps in an alternating sequence.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

The present invention pertains to a vertical-height calibration technique for a 3D printer with a build platform and extruder that move relative to one another in three dimensions. The printer includes a positioning mechanism configured to move the build platform horizontally in two directions and move the extruder vertically in response to a computer, processor, or other type of controller. A layer of object is printed or otherwise constructed by shifting the platform in the horizontal plane while simultaneously extruding thermoplastic material at a precise location onto the object being constructed. The build platform is shifted horizontally along the X-axis and/or Y-axis to precisely position the object under a nozzle that extrudes the thermoplastic material. After a layer is printed, the nozzle and build platform are moved apart a small distance and the process of printing a layer is repeated.

Before an object is 3D printed, however, the printer undertakes a calibration procedure in which the vertical position of the nozzle is determined in order to improve print quality as well as print adhesion. The printer in the preferred embodiment is configured to drive the build platform and the nozzle in a predetermined manner to precisely determine the height of the nozzle relative to the build platform.

Figure 1:
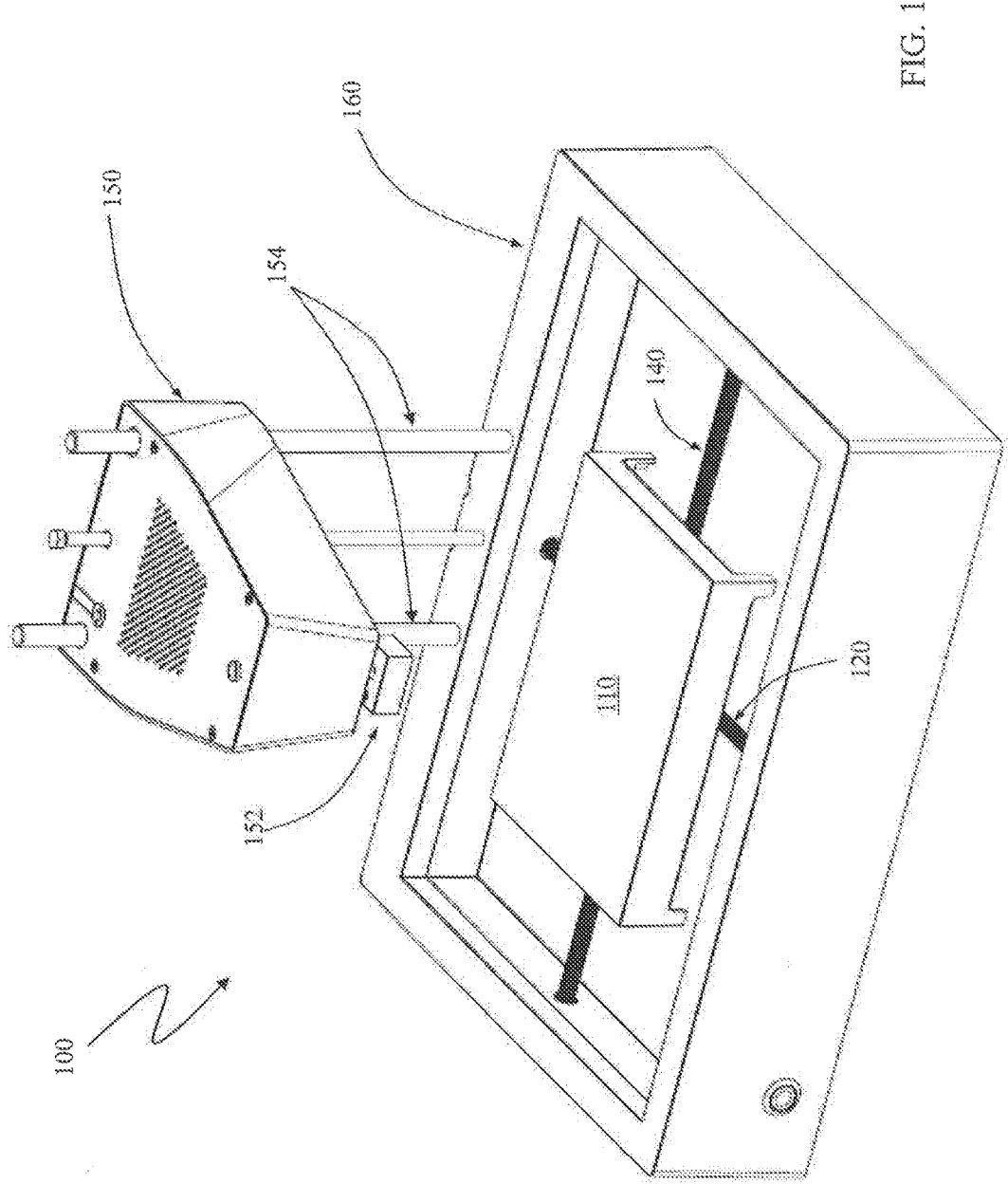
FIG. 1 is a perspective view of an extruder-based 3D printer with build platform, in accordance with a first embodiment of the present invention.

Illustrated in FIG. 1 is a preferred embodiment of a 3D printer 100 with a frame 160, a thermoplastic extruder assembly 150, a moveable build platform 110, and a positioning mechanism. The positioning mechanism includes at least one actuator (not shown) for moving the extruder assembly vertically, at least two actuators (not shown) for moving the build platform laterally, and position controller (not shown) for energizing the actuators. The build platform 110 moves relative to the frame 160 in response to rotation of the pinion wires 120 and 140. The extruder assembly 150 includes a material feeder (not shown) for inputting raw thermoplastic material, a heating element (not shown) for melting the thermoplastic material, and an extruder nozzle or head 152 for dispensing the thermoplastic material onto an object being constructed on the build platform 110. The position controller moves the platform in two dimensions as thermoplastic is dispensed from the extruder nozzle to form a layer in the form of a 2D cross-section of the object, in the preferred embodiment. Successive layers are built by raising the extruder assembly relative to the build platform 110 using stanchions or arms 154.

Figure 2:
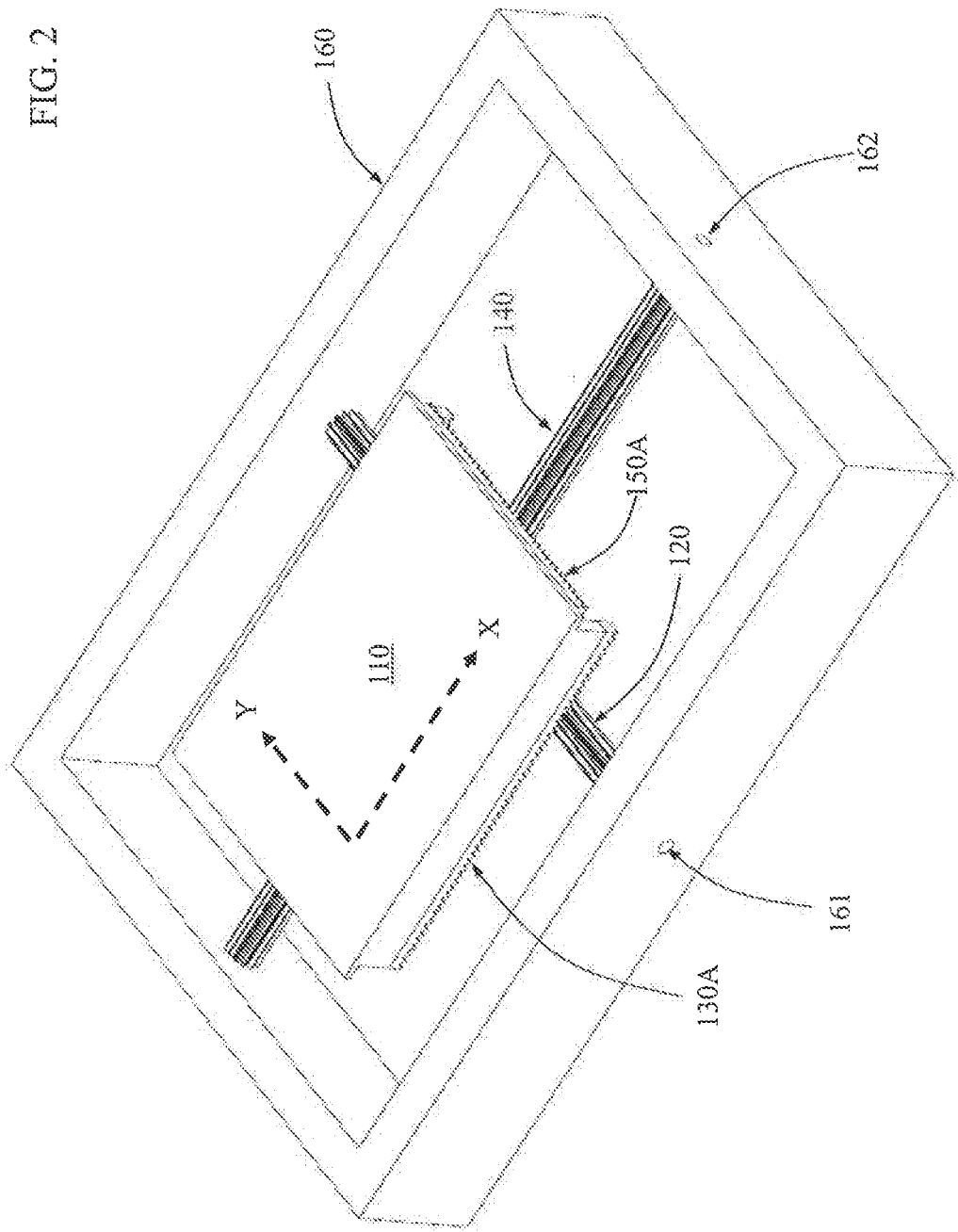
FIG. 2 is a perspective view of the top side of a positioning mechanism with a build platform, in accordance with a first embodiment of the present invention.

Illustrated in FIG. 2 is a perspective view of the upper side of the build platform 110 and frame 160. The build platform 110 includes a planar surface on the top and plurality of gear racks 130A, 150A underneath. The gear racks 130A, 150A comprise a plurality of teeth arrayed in rows across the length and width of the build platform. The gear racks 130A and 150A, in turn, engage pinion wires 120 and 140, respectively, which carry the weight of the build platform as well as move the build platform laterally. The first gear rack 130A and pinion wire 120 serve as a first rack and pinion for moving the platform in the X-direction. The second gear rack 150A and pinion wire 140 serve as a second rack and pinion for moving the platform in the Y-direction. The first rack 130A and pinion wire 120 operate substantially orthogonal to the second rack 150A and pinion wire 140. The pinion wires 120, 140 are independently driven by motors as disclosed in U.S. patent application Ser. No. 14/508,808 filed Oct. 7, 2014, which is hereby incorporated by reference herein.

Figure 3:
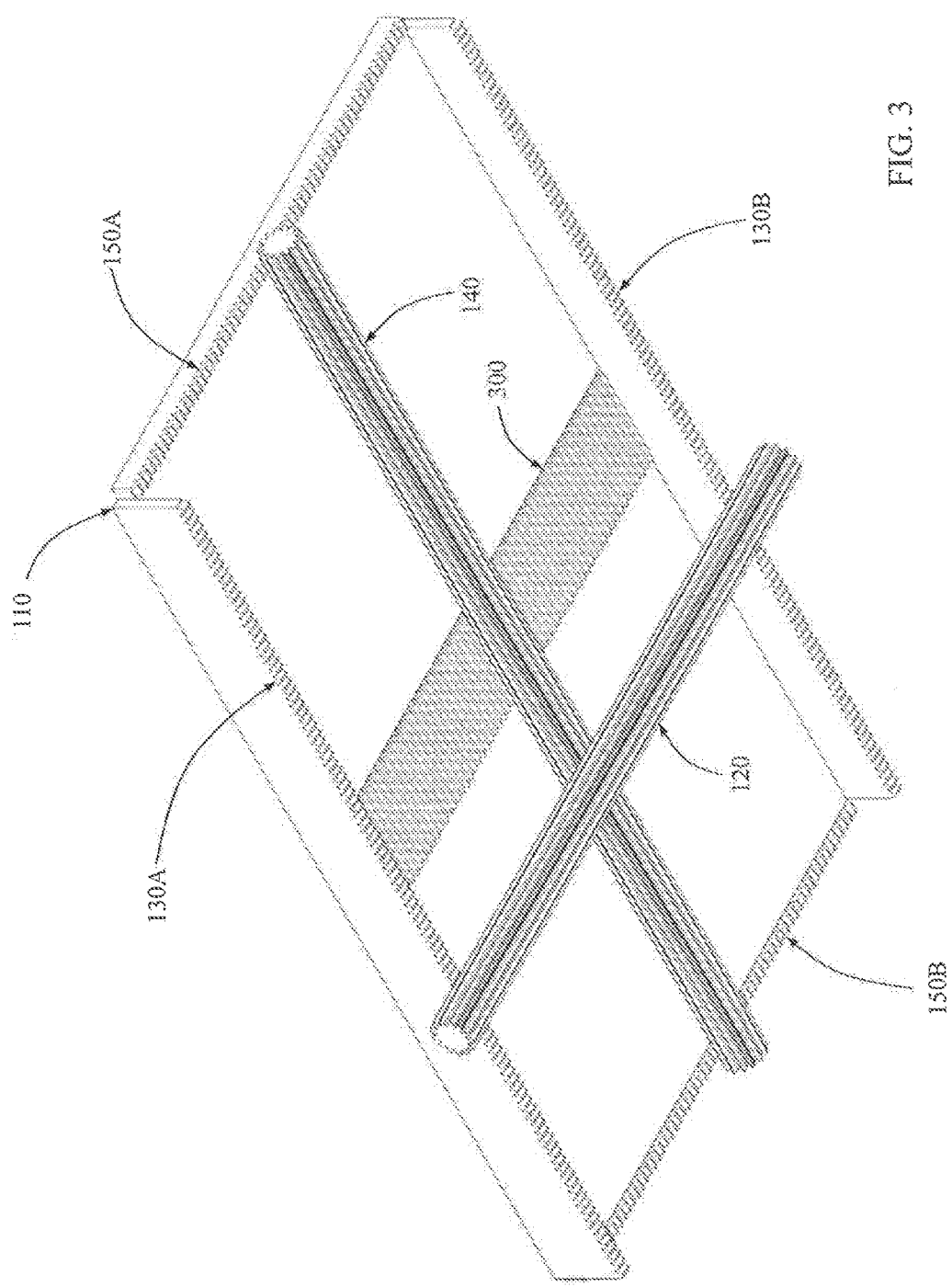
FIG. 3 is a perspective view of the underside of the build platform, in accordance with a first embodiment of the present invention.

The underside of the build platform 110 and pinion wires are illustrated in FIG. 3. The first pinion wire 120 engages a first set of gear racks 130A, 130B. Similarly, the second pinion wire 140 engages a second set of gear racks 150A, 150B. To move to the upper right, for example, the first pinion wire 120 is rotated clockwise which drives the first set of gear racks 130A, 130B. While moving to the right, the second set of gear racks 150A, 150B are configured to slide along the pinion wire 140 in a direction parallel to the pinion wire 140. Similarly, to move the build platform 110 to the upper left, the second pinion wired 140 is rotated counter-clockwise which also causes the first set of gear racks 130A, 130B to slide over and against the first pinion wire 120. Because the two pinion wires are orthogonal, the build platform 110 can be driven in any direction in the horizontal plane by turning the two pinion wires at the appropriate rates.

FIG. 3 also illustrates an alignment rack, in accordance with one embodiment of the present invention. The alignment rack 300 is configured to ensure that the build platform 110 is properly aligned with the gear racks 130A, 130B, 150A, 150B when the user sets the build platform onto the pinion wires 120, 140. The build platform is properly aligned when the pinion wires 120, 140 are fully seated into the proper teeth of their respective gear racks. That is, the first pinion wire 120 seats with the nth tooth of both gear racks 130A and 130B, and the second pinion wire 140 seats with the mth tooth of both gear racks 150A and 150B. The alignment rack is taught in U.S. Pat. No. 9,205,600 issued Dec. 8, 2015, which is hereby incorporated herein.

Figure 4:
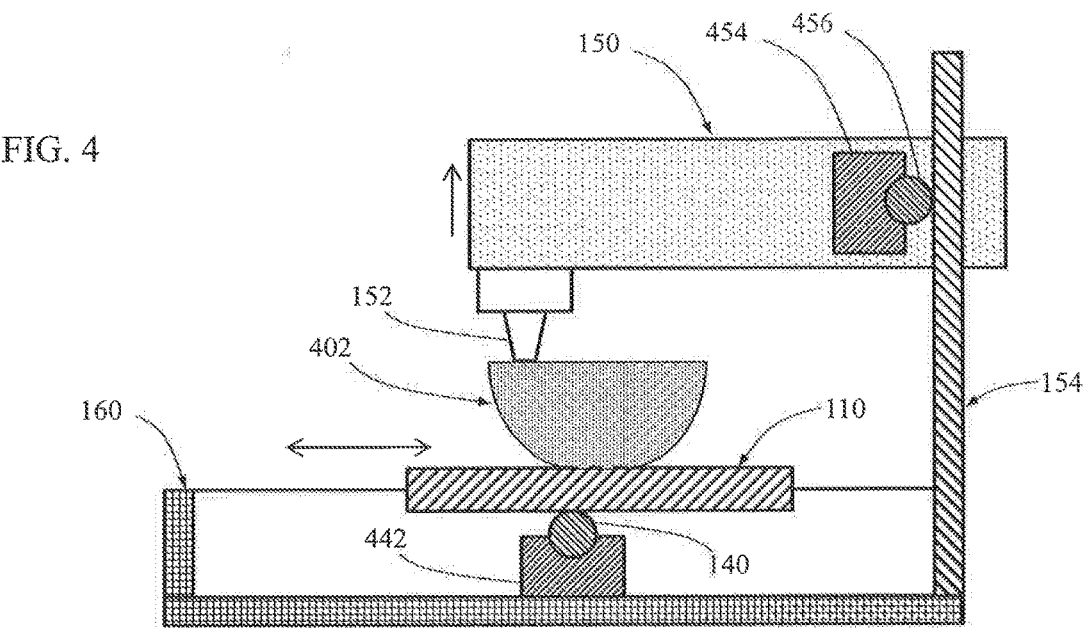
FIG. 4 is diagrammatic cross-section of the 3D printer during a print operation, in accordance with a first embodiment of the present invention.

A diagrammatic cross-section of the 3D printer during a printing operation is shown in FIG. 4. During a printing operation, the extruder assembly 150 is held stationary while the extruder head 152 ejects thermoplastic and the build platform 110 moves in a horizontal plane to produce a single layer of the object 402 under construction. When the layer is complete, the extruder assembly 150 is raised relative to the build platform 110 and the next layer of the object produced. The build platform 110 is moved by means of a pair of pinion wires including pinion wire 140 which is driven by an actuator, such as direct current (DC) motor 442. The motor 442 may include an optical encoder for acquiring feedback to determine the position and speed of the build platform. The extruder assembly 150 is raised by means of another actuator, preferably DC motor 454, and pinion 456 configured to engage the arms 154 or jack screw, for example.

Figure 5:
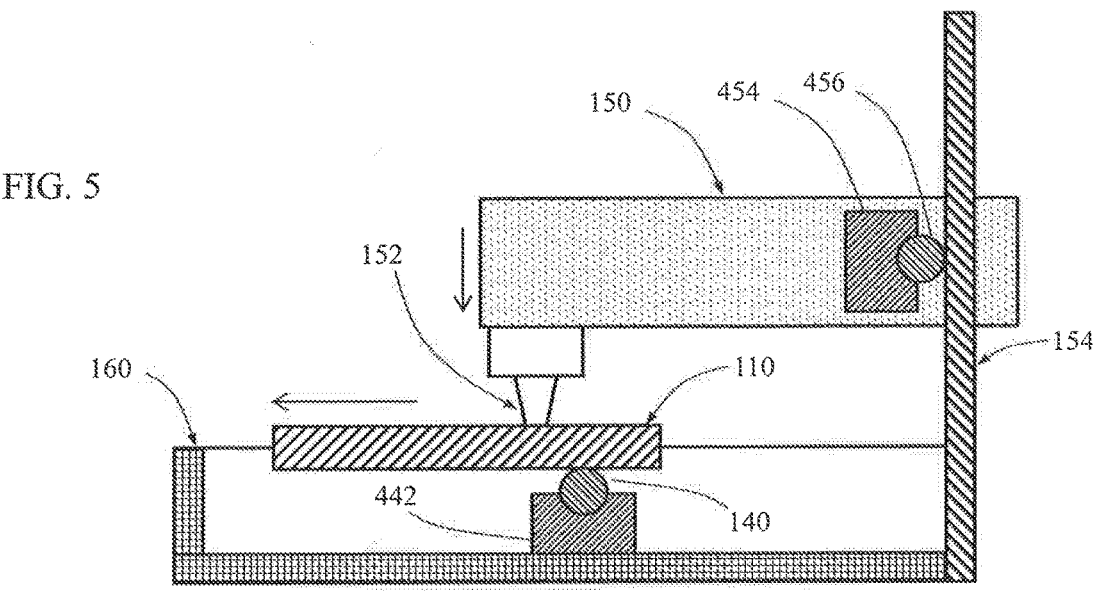
FIG. 5 is diagrammatic cross-section of the 3D printer during a calibration operation, in accordance with a first embodiment of the present invention.

A diagrammatic cross-section of the 3D printer during a calibration operation is shown in FIG. 5. The extruder assembly 150 is slowly lowered toward the build platform 110. Concurrently or sequentially, the (a) build platform 110 is shifted laterally at a constant speed, and (b) feedback from the build platform monitored to detect kinetic friction or other form of resistance to the lateral motion. In the preferred embodiment, an increase in kinetic friction is detected when the power required to drive the DC motor 442 at a constant speed increases. Before the extruder nozzle 152 contacts the build platform, the power required to drive the build platform is substantially constant. When the extruder nozzle is lowered to a point where it makes physical contact with the build platform, the kinetic friction created by the contact creates an additional load on the motor 442. In the preferred embodiment, the motor 442 is driven at a constant speed so the power supplied to motor 442 effectively increases when the nozzle contacts the build platform 110. In other embodiments, the power delivered to the motor 442 is constant, resulting in a reduction in speed when the nozzle contacts the build platform 110.

Figure 6:
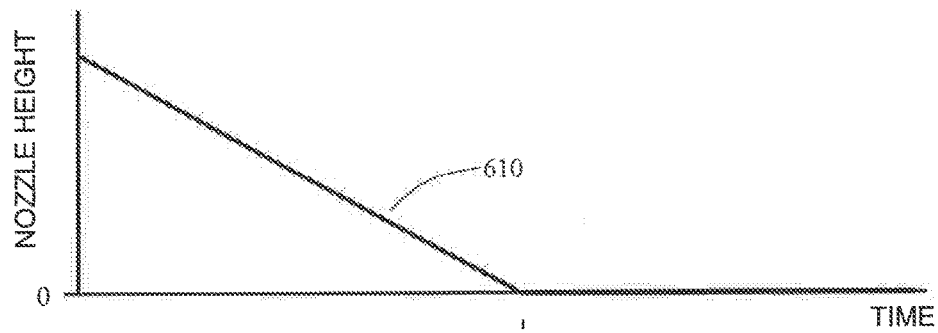
FIG. 6 is a graph plotting the distance of the nozzle relative to the moveable platform during a calibration operation, in accordance with a first embodiment of the present invention.

Illustrated in FIG. 6 is a graph plotting the distance of the nozzle 152 height relative to the build platform 110 during the calibration procedure. The plot 610 illustrates the nozzle before and after it interferes with the build platform. As can be seen, the rate at which the nozzle approaches the build platform is constant. In other embodiments, the nozzle is lowered in a step-wise fashion, each step putting the nozzle approximately 35 microns closer to the platform, which is traversing orthogonally at a rate of approximately 80 millimeters/second.

Figure 7:
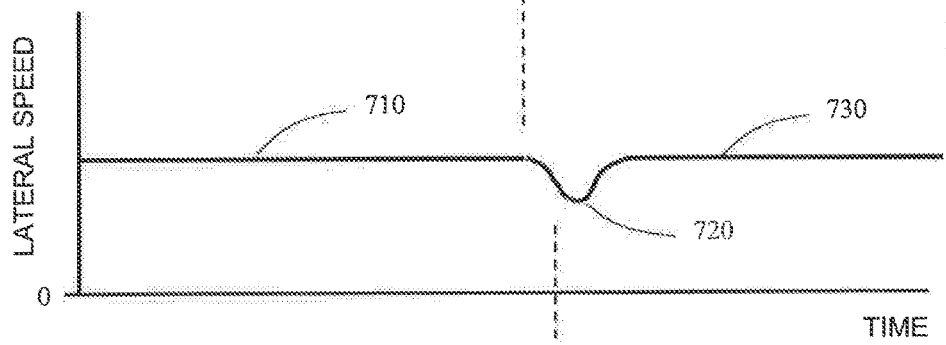
FIG. 7 is a graph plotting the lateral speed of the moveable platform relative to the nozzle during a calibration operation, in accordance with a first embodiment of the present invention.

Illustrated in FIG. 7 is a graph plotting the lateral speed of the build platform relative to the nozzle during the calibration procedure. As shown, the initial speed 710 of the build platform is substantially constant before the nozzle contacts the build platform. When contact is made, friction between the nozzle and build platform causes the speed to dip 720. Once the drop in speed is observed and/or the kinetic friction detected, the position controller automatically increases the duty cycle of the power signal used to drive the build platform actuator until the speed 730 of the build platform is restored to the pre-contact speed.

Figure 8:
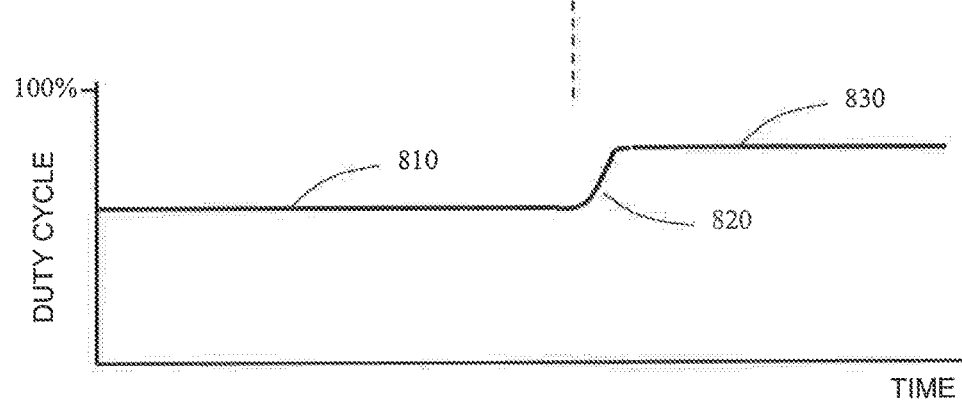
FIG. 8 is a graph plotting the power supplied to a moveable platform actuator during a calibration operation, in accordance with a first embodiment of the present invention.

Illustrated in FIG. 8 is a graph plotting the power supplied to the DC motor 442 during the calibration procedure. The controller (not shown) is configured to drive the motor with a predetermined voltage while varying the duty cycle of the power signal to achieve the desired rate of rotation. Before the extruder nozzle 152 contacts the build platform, the motor 442 is driven with a relatively-low duty cycle 810. After the extruder nozzle makes physical contact with the build platform and the platform speed drops 720, the controller increases 820 the power, specifically the current, to the motor until the controller achieves a new steady state duty cycle 830 that compensates for the kinetic friction and achieves the original lateral speed of the build platform.

For purposes of calibrating the nozzle height, the position of the extruder nozzle is set equal to zero at the point where the kinetic friction exceeds a predetermined threshold which occurs when (a) the lateral speed 720 of the build platform begins to dip 720, or (b) the duty cycle driving the motor 442 begins to increase 820, for example, linearly or substantially monotonically. Thereafter, the height of the nozzle above the build platform is precisely established. Once the nozzle height is established, the proper amount of filament may be extruded to both adhere object 402 to build platform 110 as well as create a consistent base layer for subsequent extrusion.

Figure 9:
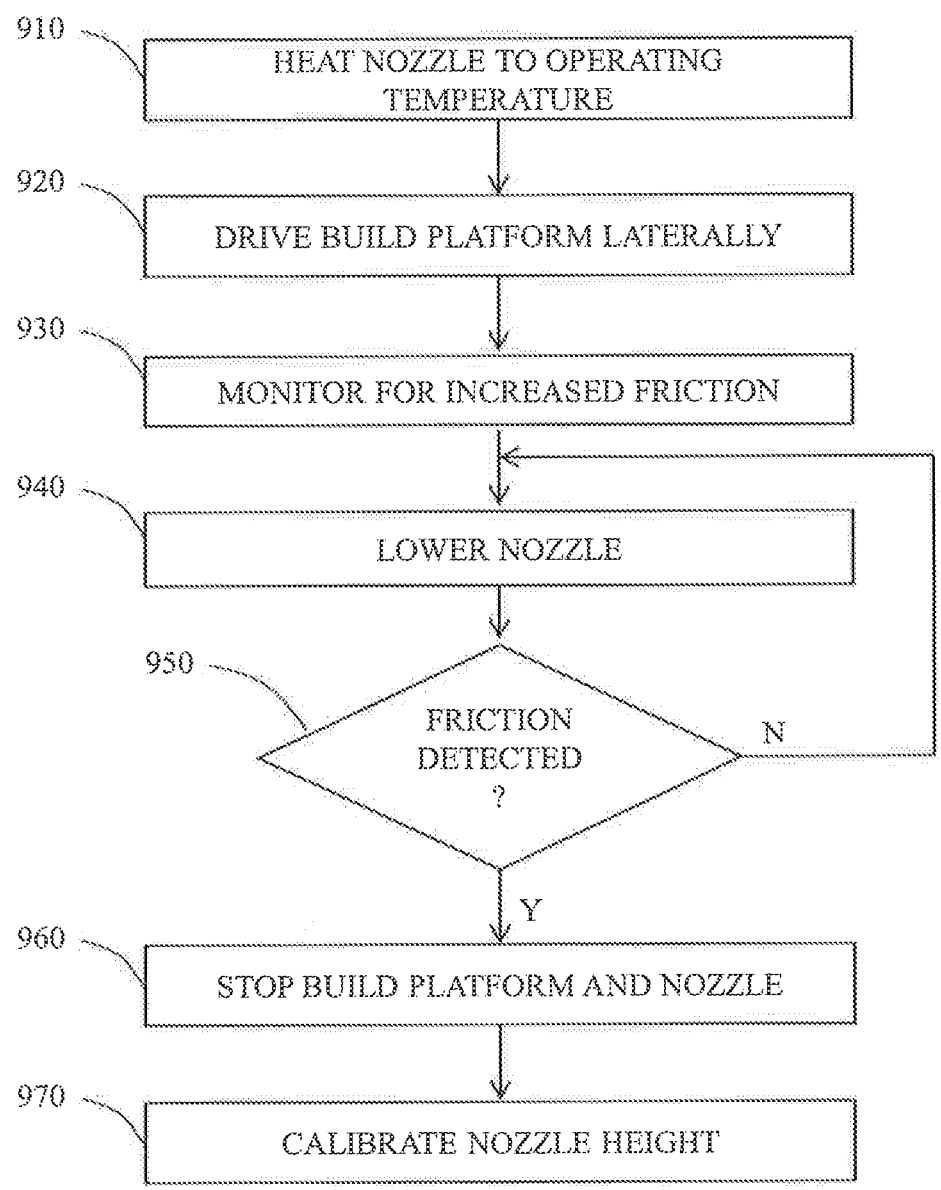
FIG. 9 is an exemplary process for calibrating the vertical height of the extruder nozzle, in accordance with a first embodiment of the present invention.

Illustrated in FIG. 9 is an exemplary process for calibrating the vertical height of the extruder nozzle in the preferred embodiment. To start, the extruder nozzle is heated 910 to its operating temperature of approximately 200 degrees Celsius. Heating is necessary to account for thermal expansion of the nozzle that occurs during normal print operations. Thereafter, the build platform is driven 920 laterally in a substantially horizontal plane. The lateral motion may be in one dimension, in the X- or Y-directions, or in two dimensions provided at least one actuator is configured with an encoder or feedback circuitry for measuring the speed of the build platform. The lateral motion continues until contact with the nozzle is detected. In other embodiments, the nozzle is moved laterally relative to the build platform.

The calibration controller begins monitoring 930 for kinetic friction between the nozzle and the build platform. Monitoring is generally continuous until friction is detected. As described above, friction may be indicated by a change in the duty cycle used to drive the build platform or a change in the speed of the build platform, for example.

The extruder nozzle is effectively lowered 940 toward the build platform in a continuous motion or in small discrete steps between 10 and 100 microns. In other embodiments, the build platform is raised toward the extruder nozzle continuous or in small discrete steps. If friction is not detected, decision block 950 is answered in the negative and the nozzle lowered further. When friction is finally detected, the build platform and nozzle are halted 960 and the height of the nozzle calibrated or zeroed 970. The nozzle is determined to be at zero at the vertical position in which the duty cycle used to drive the build platform laterally increases a predetermined amount or exceeds a predetermined threshold.

Figure 10:
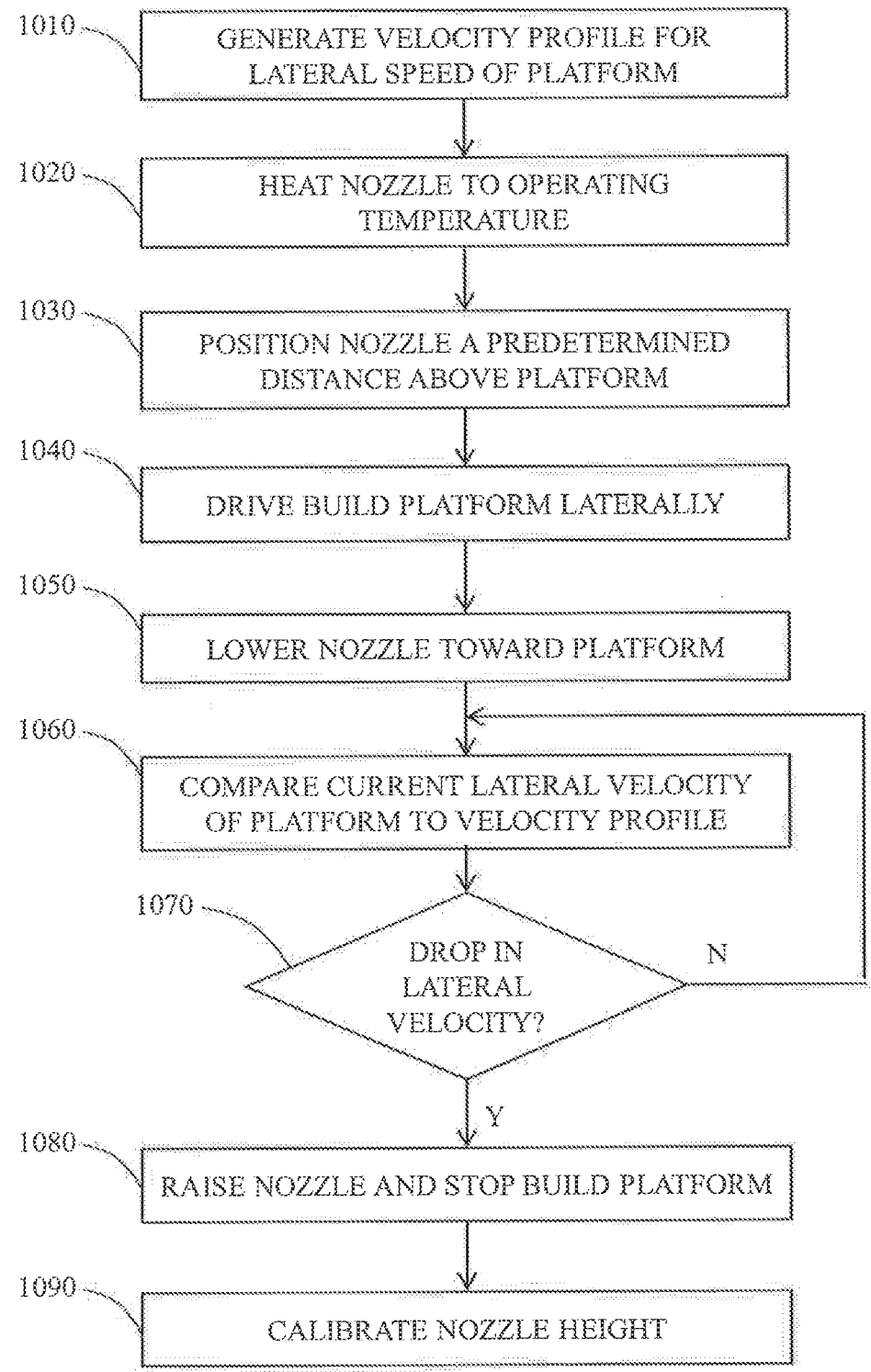
FIG. 10 is an exemplary process for calibrating the vertical height of the extrusion nozzle, in accordance with a second embodiment of the present invention.

Illustrated in FIG. 10 is another exemplary process for calibrating the vertical height of the extruder nozzle in the preferred embodiment. First, the printer generates 1010 a velocity profile for the lateral speed of the build platform 110 in the absence of friction. The velocity profile maps the instantaneous speed of the platform as a function of the position of the platform. For example, the platform may be driven along the x-axis at five millimeters per second, and the actual velocity of the platform recorded for the length of the x-axis. The actual velocity may be determined from feedback from the drive motor, for example. In general, the velocity of the platform varies slightly from target drive speed of five millimeters per second due to the manner in which the drive motor is energized, inherent friction in the drive mechanics, wear and tear on the drive mechanics, etc.

The extruder nozzle is also heated 1020 to its operating temperature of approximately 200 degrees Celsius and the extruder nozzle driven 1030 to a starting position at a predetermined distance above the platform. In practice, generation of the velocity profile, heating of the nozzle, and positioning of the nozzle may be executed in any order.

Thereafter, the build platform is driven 1040 laterally in a substantially horizontal plane at the same speed at which the velocity profile was generated. Concurrently, the extruder nozzle is lowered 1050 toward the platform at a second predetermined speed.

The calibration controller begins monitoring 1060 for kinetic friction between the nozzle and the build platform. In particular, the calibration controller compares the actual speed of the platform at each lateral position to the actual speed recorded in the velocity profile for the same lateral position. If the current speed and recorded speed are substantially the same speed, then contact is not detected and decision block 1070 answered in the negative. If and when the current velocity of the platform drops below the pre-recorded speed in the velocity profile, friction is then detected and decision block 1070 answered in the affirmative. In the preferred embodiment, the drop in speed must exceed about 5% of the speed in the velocity profile for a predetermined number of consecutive positions before the "drop" in velocity is confirmed.

The instant that the drop in velocity is detected, however, the nozzle is raised 1080, the platform stopped, and the height of the nozzle calibrated 1090 with respect to the platform.

Figure 11:
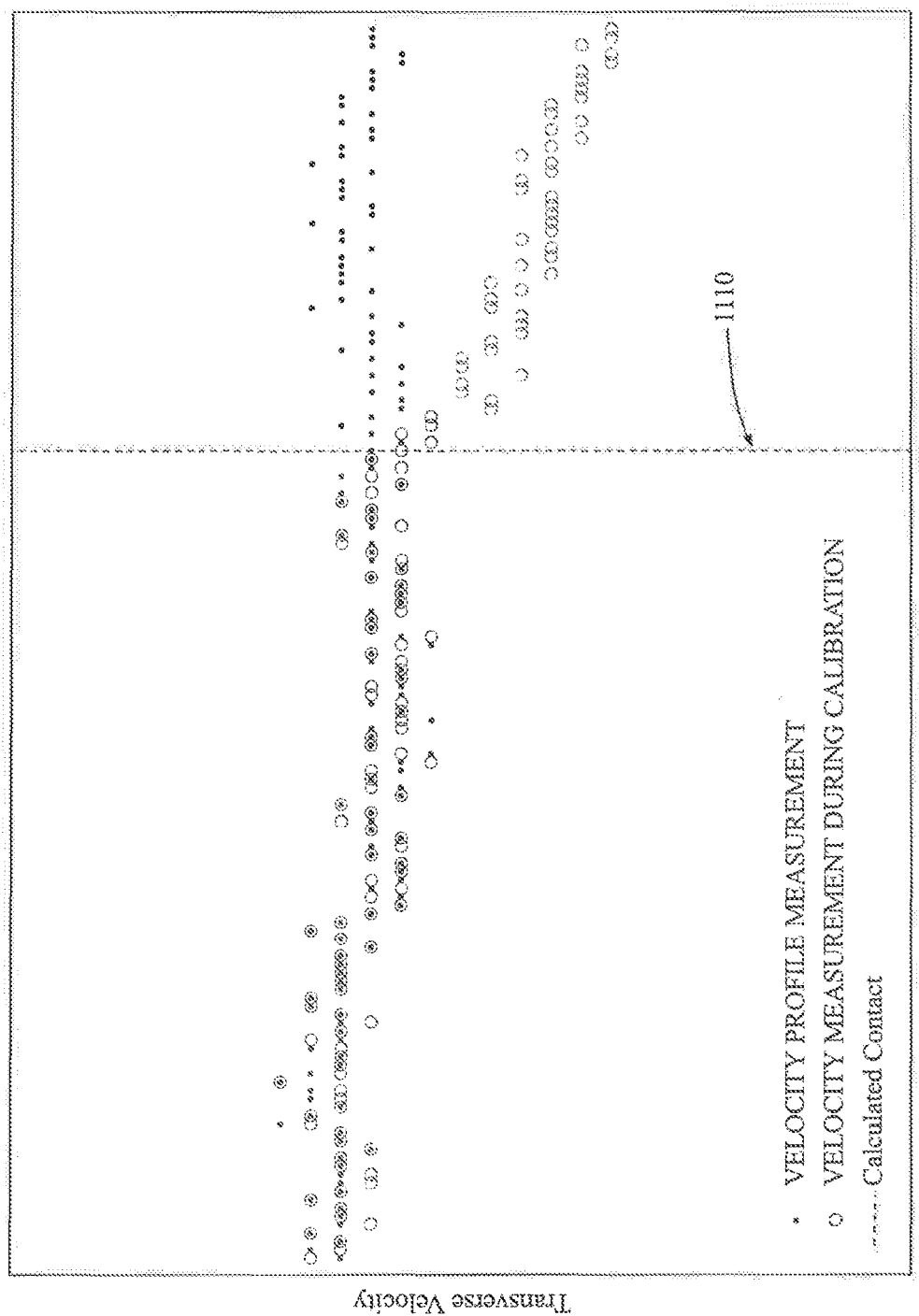
FIG. 11 is a graph of velocity measurements before and after contact between the nozzle and platform is detected, in accordance with the preferred embodiment of the present invention.

Illustrated in FIG. 11 is a graph of velocity measurements before and after contact between the nozzle and platform is detected. The lateral position of the platform is illustrated along the x-axis and the transverse velocity of the platform is illustrated along the y-axis. The velocity/position measurements that form the velocity profile are illustrated as solid black dots (●), while the velocity/position measurements of the platform during a calibration operation are illustrated by hollow circles (○). The point of actual contact between the nozzle and platform is illustrated by the vertical hashed line 1110.

As shown at the left side of the graph, the velocity measurements during calibration coincide very well with the velocity profile before the nozzle contacts the platform. Both the calibration velocity measurements and velocity profile measurements fluctuate up and down together until contact is made. After the nozzle contacts the platform, however, the velocity of the platform rapidly drops relative to the velocity profile, which is illustrated to the right. The present invention therefore enables, the z-height calibration measurement to factor out mechanical effects including position-dependent and time-dependent mechanical phenomena while preserving a precise measure of the contact needed for an accurate calibration determination.

The processing of calibrating the height of the extruder nozzle may be executed at the factory during manufacture, at start-up or configuration by the user, before each build operation, periodically, or when commanded by the user.

Although the build platform 110 is shown moving to the left and away from the arms 154 in FIG. 5, one skilled in the art will appreciate that the build platform may be moved in any direction in the horizontal plane during this calibration procedure provided the movement is substantially orthogonal to the movement of the extruder. That is, the build platform can be moved in the X-direction, the Y-direction, or a combination thereof for purposes of determining the point at which the nozzle contacts the build platform. If the build platform is moved in both the X- and Y-directions, the change in power to one or more of the two corresponding actuators may be monitored for purposes of detecting the point of contact.

In the preferred embodiment described herein, the build platform is configured to move in a horizontal plane and the extruder is configured to move vertically. The present invention may also be implemented using a 3D printer in which (a) the build platform moves vertically and the extruder moves in a horizontal plane; (b) the build platform moves vertically and horizontally while the extruder moves horizontally in a direction orthogonal to the build platform motion, and (c) the build platform is stationary and the extruder moves in three dimensions. The present invention may also be used in various other machines besides 3D printers in which one component and a platform move relative to one another in three dimensions.

The preferred embodiment described herein employs motors as well as parallel-linked rack-and-pinions to move the build platform in a horizontal plane. In other embodiments of the invention, motors and serially-linked rack-and-pinions are used to move the extruder in a horizontal plane. In still other embodiments, linear motion of the build platform and/or extruder is achieved using belt-drives, jack screws, hydraulics, pneumatics, and/or rack-and-pinion drives that operate serially rather than in parallel.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention. Therefore, the invention has been disclosed by way of example and not limitation, and reference should be made to the following claims to determine the scope of the present invention.

We claim:

1. A method of configuring a 3D printer comprising an extruder and a build platform, the method comprising:
    moving the build platform a first direction at a constant speed;
    moving the extruder nozzle toward the build platform in a second direction orthogonal to said first direction;
    monitoring power required to move the build platform at said constant speed;
    detecting an increase in power required to move the build platform at said constant speed, whereby the increase in power corresponds to friction between the build platform and the extruder nozzle;
    calibrating a position of the extruder nozzle relative to the build platform based on a position of the extruder nozzle when the increase in power was detected.

2. The method in claim 1, wherein detecting an increase in power comprises detecting an increase in current supplied to one or more actuators driving the build platform.

3. The method in claim 1, wherein the build platform and extruder nozzle move concurrently.

4. The method in claim 3, wherein the extruder nozzle moves toward the build platform in a continuous motion.

5. The method in claim 3, wherein the extruder nozzle moves toward the build platform in discrete steps.

6. The method in claim 5, wherein the build platform moves about 80 millimeters/second in the first direction; and the extruder nozzle moves in discrete steps of about 35 microns.

7. The method in claim 1, wherein the build platform and extruder nozzle move sequentially.

8. The method in claim 1, wherein the first direction is a straight line.

9. The method in claim 1, wherein the first direction is non-linear in two dimensions.

10. A 3D printer comprising:
    an extruder with an extruder nozzle for dispensing thermoplastic;
    a build platform;
    at least one actuator configured to move the build platform in a predetermined plane;
    a calibration module configured to:
        a) drive the build platform in a first direction;
        b) drive the extruder nozzle and the build platform toward one another in a second direction orthogonal to said first direction;
        c) detect an indication of kinetic friction between the build platform and the extruder; and
        d) calibrate a position of the extruder nozzle relative to the build platform based on a position of the extruder nozzle when the indication of kinetic friction was detected.

11. The 3D printer of claim 10, wherein the indication of kinetic friction is based on feedback from the at least one actuator.

12. The 3D printer of claim 11, wherein the feedback from the at least one actuator comprises power supplied to the at least one actuator.

13. The 3D printer of claim 10, wherein the indication of kinetic friction is based on a measured speed of the build platform.

14. The 3D printer of claim 10, wherein the extruder nozzle is heated to a predetermined operating temperature before the calibration module drives the extruder nozzle and the build platform toward one another.

15. A method of calibrating the distance between a first component and a second component, the method comprising:
- moving the first component and second component relative to one another in a predetermined plane;
- moving the first component and second component toward one another in a direction substantially orthogonal to the predetermined plane until the first component and second component touch;
- measuring an indication of kinetic friction to move the first component and second component relative to one another in the predetermined plane;
- determining when the measure of kinetic friction exceeds a predetermined threshold; and
- defining a position of the second component when the kinetic friction between the first component and second component exceeds the predetermined threshold.

\* \* \* \* \*